No. 891,871. PATENTED JUNE 30, 1908.
C. E. SMITH.
SCRAPER.
APPLICATION FILED AUG. 17, 1907.
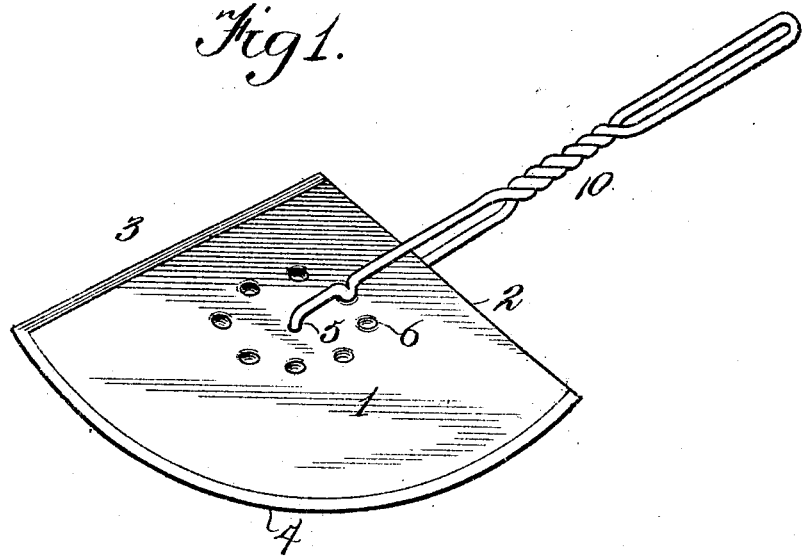
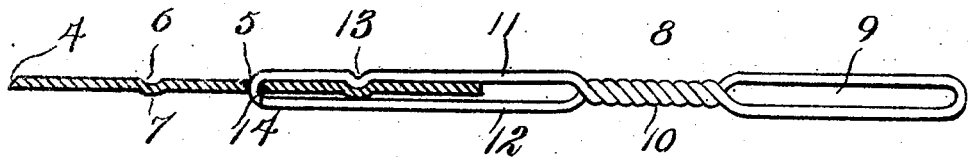
Witnesses
Hugh H. Ott
J. W. Garner
Inventor
Clara E. Smith
By Victor J. Evans
Attorney

UNITED STATES PATENT OFFICE.

CLARA E. SMITH, OF PRINEVILLE, OREGON.

SCRAPER.

No. 891,871.

Specification of Letters Patent. Patented June 30, 1908.

Application filed August 17, 1907. Serial No. 389,046.

*To all whom it may concern:*

Be it known that I, CLARA E. SMITH, a citizen of the United States of America, residing at Prineville, in the county of Crook and State of Oregon, have invented new and useful Improvements in Scrapers, of which the following is a specification.

This invention is an improved scraper for use in scraping pots, pans and the like utensils, and the same consists of a scraper plate presenting a straight scraping edge and a curved scraping edge for use respectively on straight and curved surfaces of utensils, and a handle pivotally connected to such plate or blade, such handle and such plate or blade having coacting devices to secure the handle to the blade at any desired angular adjustment with respect thereto, as hereinafter described and claimed.

The object of my invention is to provide a scraper for pots, pans and other kitchen or the like utensils, which may be manufactured at very slight cost, which is easy to keep clean and which is adapted for use both on straight or plane surfaces and on curved surfaces.

In the accompanying drawings,—Figure 1 is a perspective view of a scraper constructed in accordance with my invention. Fig. 2 is a sectional view of the same, the handle being shown in elevation.

In accordance with my invention I provide a blade or plate 1 which is preferably made of steel, is segmental in form to present converging straight edges 2, 3 and a curved edge 4. Such edges 3, 4 are beveled and sharpened and are adapted respectively for use in scraping flat surfaces, such as are presented by the sides and bottoms of pans, and for scraping a curved surface such as presented by the concaved bottom of a pot or the like. The said scraper blade or plate is provided at a point at or near its center with an opening 5, is provided in one side with a series of depressions 6 which are concentric with such opening 5, such depressions forming projections 7 on the opposite side of the scraper blade or plate.

The handle 8 is formed of a single piece of wire, preferably spring wire, which is doubled to form a hand hold 9 at its outer end, a twisted portion 10 and a pair of parallel spring arms 11 or 12, which constitute the inner end of the handle, are adapted to bear on opposite sides of the blade or plate, and the said arm 11 is provided with an offset projection 13 to enter the depressions 6 and with a pivot portion 14 to extend through the opening 5. It will be understood that the handle may be turned to any desired position with reference to the blade or plate and secured in such position by engaging its projecting stop 13 with one of the recesses or depressions 6, and it will also be understood that owing to the fact that the arms 11, 12 of the said handle are springs, said arms may be opened to remove the pivot portion 14 from the opening 5 to permit of the detachment of such handle from the blade or plate to facilitate the cleansing of the latter.

It is thought the operation and advantages of my improved scraper will be fully understood from the foregoing specification.

Having thus described the invention, what is claimed as new, is:—

A scraper of the class described comprising a plate or blade having a pivot opening and a plurality of recesses concentrically disposed with reference to such pivot opening, in combination with a handle made of a single piece of spring wire doubled to form a hand hold at the outer end, a twisted portion and a pair of parallel spring arms, said spring arms constituting the inner end of the handle, bearing on opposite sides of said plate or blade and one of said spring arms having a bent portion forming a pivot for said plate or blade and another bent portion forming a stop to engage such adjusting recesses.

In testimony whereof I affix my signature in presence of two witnesses.

CLARA E. SMITH.

Witnesses:
M. R. ELLIOTT,
R. G. SMITH